(12) United States Patent
Zhou et al.

(10) Patent No.: US 8,610,706 B2
(45) Date of Patent: Dec. 17, 2013

(54) PARALLEL SURFACE RECONSTRUCTION

(75) Inventors: Kun Zhou, Beijing (CN); Xin Huang, Redmond, WA (US); Minmin Gong, Beijing (CN); Baining Guo, Beijing (CN)

(73) Assignee: Microsoft Corporation, Redmond, WA (US)

(*) Notice: Subject to any disclaimer, the term of this patent is extended or adjusted under 35 U.S.C. 154(b) by 1138 days.

(21) Appl. No.: 12/245,707

(22) Filed: Oct. 4, 2008

(65) Prior Publication Data
US 2010/0085352 A1  Apr. 8, 2010

(51) Int. Cl.
*G06T 15/00* (2011.01)

(52) U.S. Cl.
USPC .......................................................... 345/419

(58) Field of Classification Search
None
See application file for complete search history.

(56) References Cited

U.S. PATENT DOCUMENTS

| | | | |
|---|---|---|---|
| 6,943,789 | B2 | 9/2005 | Perry et al. |
| 7,088,363 | B2 | 8/2006 | Kase et al. |
| 7,242,401 | B2 | 7/2007 | Yang et al. |
| 7,327,362 | B2 | 2/2008 | Grau |
| 2003/0067461 | A1 | 4/2003 | Fletcher et al. |
| 2003/0137529 | A1 | 7/2003 | Kobbelt et al. |
| 2006/0274065 | A1 | 12/2006 | Buyanovskiy |
| 2006/0290695 | A1 | 12/2006 | Salomie |

OTHER PUBLICATIONS

R. Shekhar, E. Fayyad, R. Yagel, J. F. Cornhill, "Octree-Based Decimation of Marching Cubes Surfaces", 1998, IEEE, Proceedings of the 7th IEEE Visualization Conference (VIS '96).*
R. Sagawa, K. Nishino, M. D. Wheeler, K. Ikeuchi, "Parallel Processing of Range Data Merging".*
S. F. Frisken, R. N. Perry, "Simple and Efficient Traversal Methods for Quadtrees and Octrees", Nov. 2002, Mitsubishi Electric Research Laboratories, TR2002-41.*
M. Kazhdan, M. Bolitho, H. Hoppe, "Poisson Surface Reconstruction", 2006, The Eurographics Association, Eurographics Symposium on Geometry Processing (2006).*
R. Westermann, L. Kobbelt, T. Ertl, "Real-time exploration of regular volume data by adaptive reconstruction of isosurfaces", 1999, Springer-Verlag, The Visual Computer (1999).*

(Continued)

*Primary Examiner* — Ulka Chauhan
*Assistant Examiner* — Robert Bader
(74) *Attorney, Agent, or Firm* — Gonzalez Saggio & Harlan LLP

(57) ABSTRACT

Described is a technology in which point cloud surface reconstruction is performed via parallel processing on a graphics processing unit, achieving real-time reconstruction rates. An octree is built for a given set of oriented points, with each node containing a set of points enclosed by the node. The data structure is built on the GPU, in parallel, using level-order traversals to process nodes at a same tree level. The surface is reconstructed based on data configured and located via the traversals. To produce the surface, an implicit function over the volume spanned by the octree nodes is computed using the GPU, e.g., based on a Poisson surface reconstruction method. A sparse linear system is built and a multi-grid solver is employed to solve the system. An adaptive marching cubes procedure is performed on the GPU to extract an isosurface of the implicit function as a triangular mesh.

20 Claims, 5 Drawing Sheets

(56) References Cited

OTHER PUBLICATIONS

J. Peng and C.-C. Jay Kuo, "Geometry-guided Progressive Lossless 3D Mesh Coding with Octree (OT) Decomposition", Jul. 2005, ACM, Proceedings SIGGRAPH '05 ACM SIGGRAPH 2005 Papers.*

Anne Dinning, "A Survey of Synchronization Methods for Parallel Computers", Jul. 1999, IEEE, Computer, vol. 22, Issue 7, pp. 66-77.*

Zhou, et al., "Highly Parallel Surface Reconstruction", Microsoft Research Asia, TR-2008-53, Apr. 2008, 10 Pages.

Lorensen, et al., "Marching Cubes: A High Resolution 3D Surface Construction Algorithm", Computer Graphics, vol. 21, No. 4, Jul. 1987, pp. 163-169.

Hoppe, et al., "Surface Reconstruction from Unorganized Points", Proceedings of the 19th annual conference on Computer graphics and interactive techniques, 1992, pp. 71-78.

Kari Pulli, "Surface Reconstruction and Display from Range and Color Data", 1997, A dissertation submitted in partial fulfillment of the requirements for the degree of Doctor of Philosophy, University of Washington, 141 Pages.

Ajmera, et al., "Fast, Parallel, GPU-based Construction of Space Filling Curves and Octrees", Proceedings of the 2008 symposium on Interactive 3D graphics and games, 2008, 1 Page.

* cited by examiner

440  LUTparent[4][9] = {
{0, 1, 1, 3, 4, 4, 3, 4, 4},
{1, 1, 2, 4, 4, 5, 4, 4, 5},
{3, 4, 4, 3, 4, 4, 6, 7, 7},
{4, 4, 5, 4, 4, 5, 7, 7, 8} };
FIG. 4A
442  LUTchild[4][9] = {
{3, 2, 3, 1, 0, 1, 3, 2, 3},
{2, 3, 2, 0, 1, 0, 2, 3, 2},
{1, 0, 1, 3, 2, 3, 1, 0, 1},
{0, 1, 0, 2, 3, 2, 0, 1, 0} };
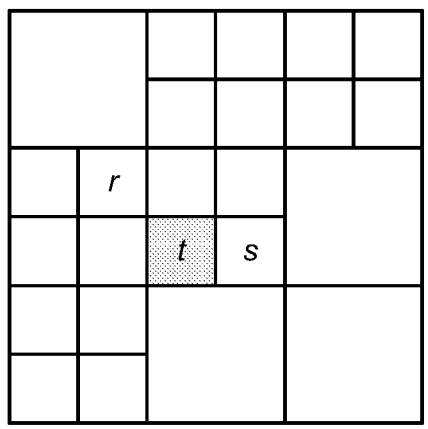 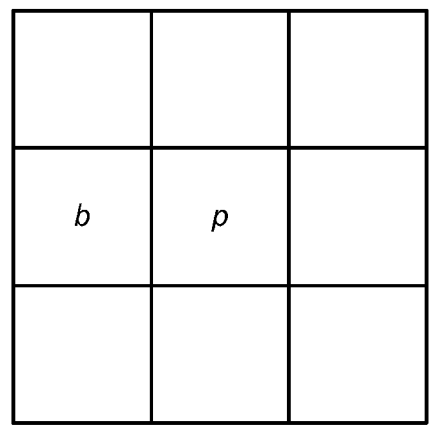
FIG. 4B

PARALLEL SURFACE RECONSTRUCTION

BACKGROUND

Surface reconstruction from point clouds is actively researched in computer graphics. This reconstruction approach is widely used for fitting three-dimensional scanned data, filling holes on surfaces, and re-meshing existing surfaces.

Although a number of algorithms exist that are capable of producing high-quality surfaces, because of the computational complexity, each such algorithm operates as an offline process, e.g., cannot be used for real time graphics processing. In other words, none of the surface reconstruction algorithms can achieve interactive performance for editing and the like.

Moreover, such algorithms generally can only handle noise-free and uniformly-sampled point clouds. For noisy data, this method may fail to produce an acceptable surface. For example, with real-world scanned data, some areas of the surface may be under-sampled or completely missing. Automatic techniques fail to faithfully reconstruct the topology of the surface around these areas.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which surface reconstruction is performed via parallel processing on a graphics processing unit, achieving real-time reconstruction rates. A data structure of nodes (an octree) is built for a given set of oriented points, with each node containing a set of points enclosed by the node (that is, a subset of the set of points). The data structure is built on the GPU, in parallel, using level-order traversals to process nodes at a same tree level. The surface is reconstructed based on data configured and located via the traversals.

In one aspect, given a set of oriented points, an algorithm first builds the octree. An implicit function over the volume spanned by the octree nodes is computed using the GPU, e.g., based on a Poisson surface reconstruction method; a sparse linear system is built and a multi-grid solver is employed to solve the system. An adaptive marching cubes procedure is performed on the GPU to extract an isosurface of the implicit function as a triangular mesh.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIGS. 4A and 4B are representations of lookup tables (FIG. 4A) and the use of the lookup tables to compute neighboring nodes (FIG. 4B).

DETAILED DESCRIPTION

Various aspects of the technology described herein are generally directed towards parallel surface reconstruction using the parallel architecture of a contemporary, programmable graphics processing unit (GPU). As with other surface reconstruction methods, an algorithm as described herein first builds an octree for a given set of oriented points, then computes an implicit function over the space of the octree, and extracts an isosurface as a watertight triangle mesh. However, in contrast to other methods, the technology described herein provides a technique for octree construction on a GPU. This technique builds octrees in real-time, and uses level-order traversals to exploit the parallelism of the GPU.

As a result, octrees are produced that provide fast access to the neighborhood information of each octree node, which in turn provides fast GPU surface reconstruction. For example, with fast octree construction, the GPU algorithm may performs Poisson surface reconstruction, which produces high-quality surfaces through global optimization. As a more particular example, given a set of points on the order of 500,000, the exemplified algorithm runs at the rate of about five frames per second, which is over two orders of magnitude faster than previous CPU algorithms. This facilitates interactive surface reconstruction, including a user-guided surface reconstruction technique that reduces topological ambiguities and improves reconstruction results for imperfect scan data. The technology may be used to perform dynamic "on-the-fly" conversion from dynamic point clouds to surfaces.

While some of the examples described herein are directed towards a parallel surface reconstruction algorithm implemented using NVIDIA Corporation's CUDA programming framework, e.g., to leverage a set of convenient parallel primitives such as scan, compact and sort, it is understood that these are only examples. Other frameworks may be used, along with graphics processors from other vendors, and other code and functions may be substituted for such primitives. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and surfacing in general.

Figure 1:
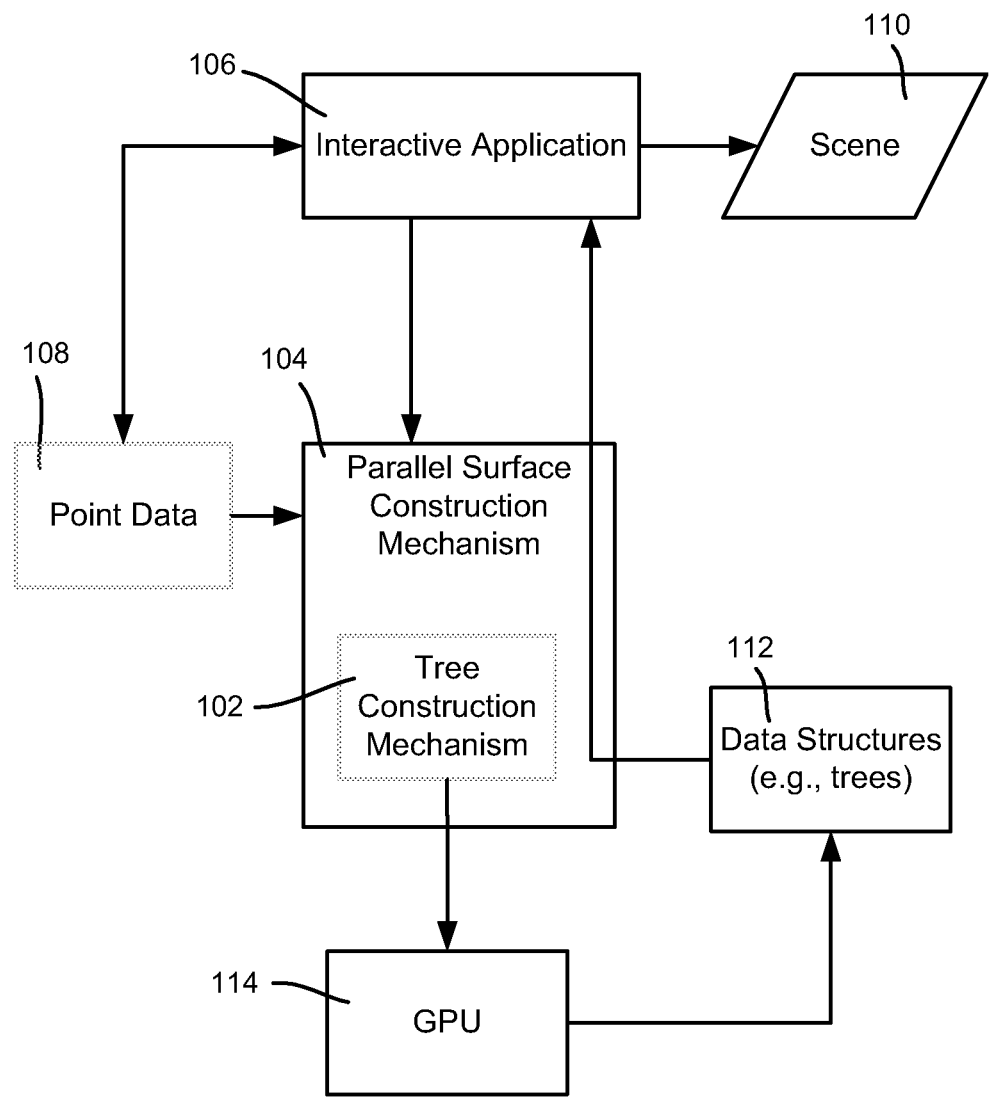
FIG. 1 is a block diagram showing example components for octree building and parallel surface reconstruction.

Turning to FIG. 1, there is shown a general block diagram exemplifying how a tree building mechanism 102 of a parallel surface construction mechanism (algorithm) 104 may work with an interactive application 106 (which may be an operating system component) and its point data 108 to dynamically render a scene 110. In general, the application 106 calls an API or the like (e.g., with supplied parameters) to work with the parallel surface construction mechanism (algorithm) 104, which uses the tree construction mechanism 102 to build data structures 112 (e.g., octrees and/or other suitable data structures) as needed to produce the data for displaying the surface. The tree construction mechanism 102 provides code and data for execution in the GPU 114, which executes the code to build the data structures 112.

In one aspect, there is provided fast octree construction of the GPU, including by building octrees in real-time via the GPU's parallelism, and then using level-order traversals. In contrast to conventional CPU octree builders which often construct trees by depth-first traversals, the GPU-based technique processes the octree nodes at the same tree level in parallel, one level at a time. With level-order traversals, the technique leverages the parallelism by spawning a new thread for every node at the same tree level. In one current implementation, 256 threads are used for each block, wherein the block number is computed by dividing the total number of parallel processes by the thread number per block. For example, in Step 2 (line 5) of Listing 1 (described below), the block number is N/256.

In another aspect, octrees are constructed that supply the information necessary for GPU surface reconstruction. In particular, the octree data structure provides fast access to tree nodes as well as the neighborhood information of each node (e.g., links to the neighbors of the node). While information of individual nodes is relatively easy to collect, computing the neighborhood information requires a large number of searches for every single node. Collecting neighborhood information for the nodes of the tree is thus extremely expensive, even on the GPU.

To address this problem, the algorithm takes advantage of the observation that a node's neighbors are determined by the relative position of the node with respect to its parent and its parent's neighbors. Based on this observation, two look up tables (LUT) are built, which record the indirect pointers to a node's relatives. Unlike direct pointers, indirect pointers are independent of specific instances of octrees and thus can be pre-computed. At runtime, the actual pointers are quickly generated by querying the LUTs.

Further, based on octrees built in this manner, there is provided a GPU algorithm for the known Poisson surface reconstruction method; the Poisson method can reconstruct high quality surfaces through a global optimization. As part of the GPU algorithm, the algorithm derives an efficient procedure for evaluating the divergence vector in the Poisson equation and an adaptive marching cubes procedure for extracting isosurfaces from an implicit function defined over the volume spanned by an octree. As will be seen, these procedures are designed to exploit a modern GPU's fine-grained parallel architecture and use the octree neighborhood information. Note that GPU algorithms can also be readily designed for other implicit reconstruction methods by using the described octree construction technique and the adaptive marching cubes procedure for extracting isosurfaces on the GPU.

To build an octree O with maximum depth D from a given set of sample points $Q=\{q_i|i=1, \ldots N\}$, the design of the octree data structure comprises four arrays, namely a vertex array, edge array, face array, and node array. The vertex, edge, and face arrays record the vertices, edges, and faces of the octree nodes, respectively. These arrays are relatively straightforward. In the vertex array, each vertex v records v.nodes, the pointers to the octree nodes that share vertex v. Following v.nodes, related elements may be reached, such as any edges sharing v. In the edge array, each edge records the pointers to its two vertices. Similarly in the face array each face records the pointers to its four edges.

Figures 2A, 2B, 2C:
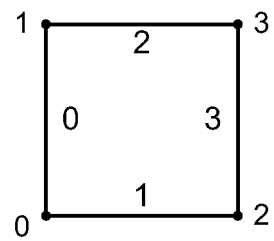
FIGS. 2A-2C are representations of elements of data structures including the ordering of vertices and edges in a node (FIG. 2A), the ordering of a node's children and the ordering of nodes sharing a vertex, (FIG. 2B), and ordering of a node's neighboring nodes (FIG. 2C).

FIG. 2A-2C show element ordering for quadtrees; the case with octrees is analogous. FIG. 2A shows the ordering of vertices (outside the box) and edges (inside the box) in a node. FIG. 2B shows the ordering of a node's children as well as the ordering of nodes sharing a vertex. FIG. 2C shows the ordering of a node's neighboring nodes.

The node array, which records the octree nodes, is more complex. Each node t in the node array NodeArray contains three pieces of information, namely (1) the shuffled xyz key named t.key, (2) the sample points contained in t, and (3) pointers to related data including its parent, children, neighbors, and other information as described below.

The shuffled xyz key is used because each octree node has eight children, whereby it is convenient to number a child node using a 3-bit code ranging from zero to seven. This 3-bit code encodes the sub-region covered by each child. Using the xyz convention, if the x bit is one, the child covers an octant that is "right in x"; otherwise the child covers an octant that is "left in x". The y and z bits are similarly set. The shuffled xyz key of a node at tree depth D is defined as the bit string $x_1y_1z_1x_2y_2z_2 \ldots x_Dy_Dz_D$, indicating the path from the root to this node in the octree. Therefore a shuffled xyz key at depth D has three D bits. One implementation uses 32 bits to represent the key, allowing a maximum tree depth of 10. The unused bits are set to zero.

Each octree node records the sample points enclosed by the node. The sample points are stored in a point array and sorted such that all points in the same node are contiguous. Therefore, for each node t, the point array only needs to store the number of points enclosed, t.pnum, and the index of the first point, t.pidx.

Connectivity pointers are stored for each node, that is, the pointers to the parent node, 8 child nodes, 27 neighboring nodes including itself, 8 vertices, 12 edges, and 6 faces are recorded. The pointers are represented as indices to the corresponding arrays. For example, t's parent node is NodeArray[t.parent] and t's first neighboring node is NodeArray[t.neighs[0]]. If the pointed element does not exist, the corresponding pointer is set to −1. Since each node has 27 neighbors at the same depth, the array t.neighs is of size 27. For consistent ordering of the related elements, these elements are ordered according to their shuffled xyz keys. For example, t's first child node t.children[0] has the smallest key among t's eight children and the last child t.children[7] has the largest key. For a vertex, its key value is defined as the sum of the keys of all nodes sharing the vertex. In this way, vertices can also be sorted; similarly, edges and faces can be sorted.

One example node array is built using a reverse level-order traversal of the octree, starting from the finest depth D and moving towards the root, one depth at a time. Listing 1 provides the pseudo code for the construction of NodeArrayD, the node array at depthD:

Listing 1:

```
1: // Step 1: compute bounding box
2: Compute Q's the bounding box using Reduce primitive
3: // Step 2: compute shuffled xyz key and sorting code
4: code ← new array
5: for each i = 0 to N − 1 in parallel
6:    Compute key, q_i's shuffled xyz key at depth D
7:    code[i] = key << 32 + i
8: // Step 3: sort all sample points
9: sortCode ← new array
10: Sort(sortCode, code)
11: Generate the new point array according to sortCode
12: // Step 4: find the unique nodes
13: mark ← new array
14: uniqueCode ← new array
15: for each element i in sortcode in parallel
16:    if sortCode[i].key ≠ sortCode[i − 1].key then
17:       mark[i] = true
18:    else
19:       mark[i] = false
```

Listing 1:

```
20: Compact(uniqueCode, mark, sortCode)
21: Create uniqueNode according to uniqueCode
22: // Step 5: augment uniqueNode
23: nodeNums ← new array
24: nodeAddress ← new array
25: for each element i in uniqueNode in parallel
26:     if element i − 1 and i share the same parent then
27:         nodeNums[i] = 0
28:     else
29:         nodeNums[i] = 8
30: Scan(nodeAddress, nodeNums, +)
31: // Step 6: create NodeArray_D
32: Create NodeArray_D
33: for each element i in uniqueNode in parallel
34:     t = uniqueNode[i]
35:     address = nodeAddress[i] + t.x_D y_D z_D
36:     NodeArray_D[address] = t
```

Figure 3:
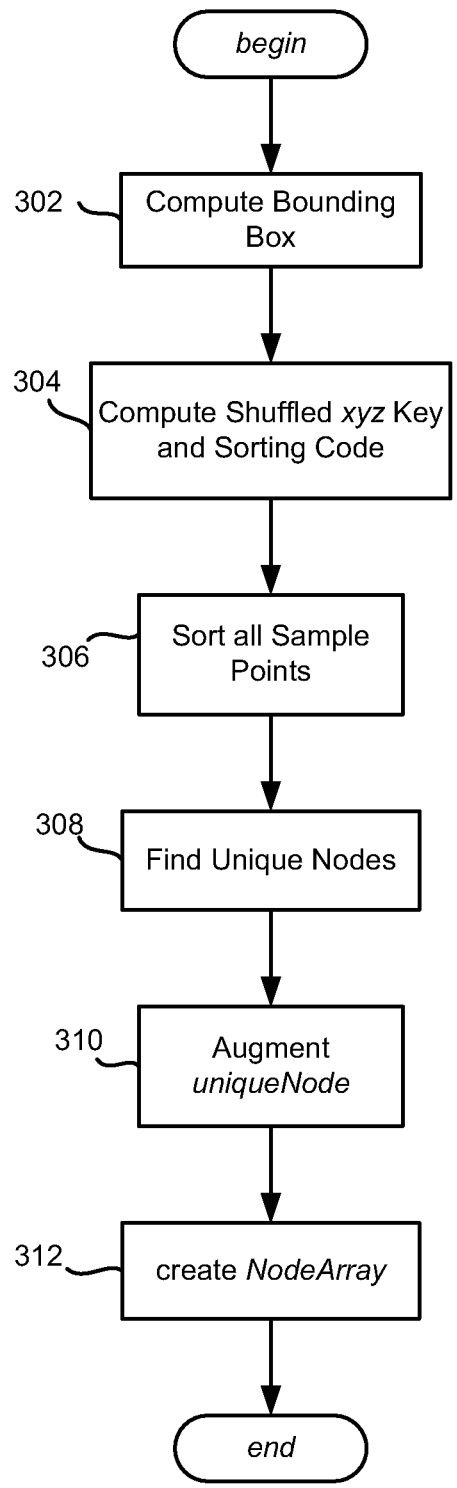
FIG. 3 is a flow diagram showing example steps for building a node array.

This construction process comprises six steps generally represented in FIG. 3. In a first step 302, the bounding box of the point set Q is computed. This is done by carrying out parallel reduction operations on the coordinates of all sample points. The Reduce primitive performs a scan on an input array and outputs the result of a binary associative operator, such as min or max, applied to all elements of the input array.

In step 304, the process computes the 32-bit shuffled xyz keys at depth D for all sample points, in parallel. Given a point p, its shuffled xyz key is computed in a top-down manner. The x bit at depth d, $1 \le d \le D$, is computed as:

$$x_d = \begin{cases} 0, & \text{if } p \cdot x < C_d \cdot x, \\ 1, & \text{otherwise,} \end{cases}$$

where $C_d$ is the centroid of the node that contains p at depth d−1. The y and z bits $y_d$ and $z_d$ are similarly computed. Unused bits are set to zero. The shuffled xyz key and the 32-bit point index are concatenated to a 64-bit code for the subsequent sorting operation.

At step 306, the sample points are sorted using a known sort primitive, which first performs a split-based radix sort per block and then a parallel merge sort of blocks. After sorting, points having the same key are contiguous in the sorted array. Then the index of each sample point in the original point array is computed by extracting the lower 32 bits of the point's code. The new point array is then constructed by copying the positions and normals from the original point array using the extracted indices.

At step 308, a node array is generated by removing duplicate keys in the sorted array, as follows. First, for each element of the sorted array, the element is marked as invalid if its key value equals that of its preceding element in the array. Then, a compact primitive is used to generate the node array which does not contain invalid elements. During this process, the relationship between the point array and the node array can be easily built. More particularly, for each element of the node array, the number of points contained by this node and the index of the first point in the point array are recorded.

At step 310, the node array obtained via step 308 is augmented to ensure that each node's seven siblings are also included, since each octree node has either eight or zero children. Note that in lines 25~29 of the pseudo code, each element in the node array is checked to see if it shares the same parent with the preceding element. This is done by comparing their keys. If the result is yes, nodeNums[i] is set to zero; otherwise it is set to eight. Then a parallel prefix sum/scan primitive is performed on the array nodeNums, and the result is stored in the array nodeAddress. Each element of nodeAddress thus holds the sum of all its preceding elements in nodeNums. In other words, nodeAddress contains the starting address of every distinct node in the final node array.

Via step 312, the node array NodeArrayD is created. For each node that is added at step 310, only the key value is computed and the number of points contained is set to zero. For each node in uniqueNode, its corresponding element in NodeArrayD is located through nodeAddress and its 3-bit $x_D y_D z_D$ key, the node's data copied to this element. For each sample point in the point array, the pointer to the octree node that contains it is saved.

At other depths, the node array (e.g., at depth D-1) can be easily built from NodeArrayD. Recall that the eight siblings having the same parent are contiguous in NodeArrayD. For every eight sibling nodes in NodeArrayD, a parent node is generated by setting the last three bits of the keys of these nodes to zero. Again, the resulting parent nodes are augmented (as in step 310) to generate the final array NodeArrayD-1. At this point, each node in NodeArrayD can get the index of its parent node in NodeArrayD-1. For each node t in NodeArrayD-1, the pointers to its children are saved. The number of points t.pnum is computed as the sum of that of t's children, and the index of the first point t.pidx is set to be that of t's first child. The node arrays at other depths can be built the same way. The node arrays of all depths are then concatenated to form a single node array, NodeArray. Another array BaseAddressArray is also created, with each element of the array recording the index of the first node at each depth in NodeArray.

With respect to computing neighborhood Information, for each octree node in NodeArray, the process finds its neighboring octree nodes at the same depth. This neighborhood information used for computing the implicit function and running the marching cubes procedure (described below), and is also used for building the vertex, edge, and face arrays. Listing 2 shows the computing of neighboring nodes:

Listing 2:

```
1: for each node t at depth d in parallel
2:     for each j = 0 to 26 in parallel
3:         i ← t's 3-bit xyz key
4:         p ← NodeArray[t.parent]
5:         if p.neighs[LUTparent[i][j]] ≠ −1 then
6:             h ← NodeArray[p.neighs[LUTparent[i][j]]]
7:             t.neighs[j] = h.children[LUTchild[i][j]]
8:         else
9:             t.neighs[j] = −1
```

Further provided is a lookup table (LUT)-based technique for computing the neighborhood information of every octree node efficiently, in parallel. Each node has up to 26 neighbors at the same depth, distributed among its sibling nodes and the child nodes of its parent's neighbors. One way to compute the neighbors is to enumerate all these candidate nodes, which requires 26×27×8=5616 searches for each node (26 neighbors, its parent and 26 neighbors of its parent, each neighbor having 8 children). An alternative approach provided herein is based on the observation is that a node's neighbors are determined by the relative position of the node with respect to its parent and its parent's neighbors; based on this observation, two lookup tables (LUTs) may be pre-computed to significantly speed up this neighborhood computation. Two such tables are shown in FIG. 4A, and are defined as a parent table 440, LUTparent, and a child table 442 LUTchild.

The parent table comprises a two-dimensional array providing the following information: for an octree node t whose parent is p, if t's index (or xyz key) in p.children is i, then the index of t.neighs[j]'s parent in p.neighs is LUTparent[i][j].

The child table LUTchild is a two-dimensional array with the following information: For the node t with parent p and index i in p.children as above, if node t's j-th neighbor t.neighs[j], whose parent node is h, the index of t.neigh[j] in h.children is LUTchild[i][j]. The size of both tables is 8×27.

For convenience a node is regarded as a neighbor of itself with index 13 in neighs. Note that two kinds of pointers are distinguished. Direct pointers are those represented as indices into one of the "global" arrays: the node, vertex, edge, and face arrays. For example, t.parent is a direct pointer. Indirect pointers are those represented as indices into one of the "local" arrays of a node: t.neighs, t.children, t.vertices, t.edges, and t.faces. The above-described tables record only indirect pointers, which are independent of specific instances of octrees and thus can be precomputed.

Listing 2 provides the pseudo-code for computing the neighboring nodes for each node t at depth d in parallel. First, it fetches t's parent p and its xyz key, which is t's index in p.children. To compute t's j-th neighbor t.neighs[j], this neighbor's parent node h is found by querying LUTparent, getting the neighbor using a second query to LUTchild; (this technique only needs 27 searches and is over two orders of magnitude faster than conventional approaches).

For clarity quadtrees are used in FIGS. 4A and 4B to illustrate Listing 2. The two tables for quadtrees, LUTparent and LUTchild, are of size 4×9 as shown in FIG. 4A. As shown in FIG. 4B, the quadtree node t's parent is p, and t's index in p.children is 0 (i.e., i=0). To compute t's 2-th neighbor (i.e., j=2), we first get p's 1-th neighbor, which is b, according to LUTparent[0][2]=1. Because LUTchild[0][2]=3, b's 3-th child, which is r, is the neighboring node desired. Therefore, t.neighs[2]=b.children[3]=r.

To compute t's 7-th neighbor (i.e., j=7), the process gets first get p's 4-th neighbor, which is p itself, according to LUTparent[0][7]=4. Because LUTchild[0][7]=1, p's 1-th child, which is s, is the node that is wanted. Therefore, t.neighs[7]=p.children[1]=s.

When computing a node's neighbors, its parent's neighbors are required. For this reason code corresponding to Listing 2 is preformed for all depths using a (forward) level-order traversal of the octree. If node t's j-th neighbor does not exist, t.neighs[j] is set as −1. For the root node, all its neighbors are −1, except its 13-th neighbor which is the root itself.

With respect to collecting information of vertices, edges, and faces of octree nodes by computing vertex, edge, and face arrays, for a vertex array, each octree node has eight corner vertices. Adding the eight vertices of every node into the vertex array introduces many duplicates because a corner may be shared by up to eight nodes. One way to create a duplication-free vertex array is to sort all the candidate vertices by their keys and then remove duplicate keys, however, thus is inefficient due to the large number of nodes, e.g., on the order of 670 thousand nodes at depth 8, with the number of candidate vertices over five million.

A more efficient way to create the vertex array makes use of node neighbors computed as described above. Building the vertex array at octree depth d first finds, in parallel, a unique owner node for every corner vertex. The owner node of a corner is defined as the node that has the smallest shuffled xyz key among all nodes sharing the corner. Observing that all nodes that share corners with node t have to be t's neighbors allows quickly locating the owner of each corner from t's neighbors. Second, for each node t in parallel, all corner vertices whose owner is t itself are collected. The unique vertex array is then created. During this process, the vertex pointers t.vertices are saved. For each vertex v in the vertex array, the node pointers v.nodes are also appropriately set.

To build the vertex array of all octree nodes, the above process is performed at each depth independently, and the resulting vertex arrays are concatenated to form a single vertex array. Unlike the node array, this vertex array still has duplicate vertices between different depths. However, since this does not affect subsequent surface reconstruction, these duplicate vertices may be left as is.

With respect to other arrays, the edge and face arrays can be built in a similar way. For each edge/face of each node, its owner node is found. Then the unique edge/face array is created by collecting edges/faces from the owner nodes.

With respect to GPU surface reconstruction, to reconstruct surfaces from sample points using the octree constructed as above, the reconstruction generally comprises two steps. First, an implicit function $\phi$ over the volume spanned by the octree nodes is computed using Poisson surface reconstruction. Then, an adaptive marching cubes procedure extracts a watertight mesh as an isosurface of the implicit function. Note that, instead of Poisson surface reconstruction, other known methods for GPU surface reconstruction may be used. As mentioned above, however, the Poisson approach reconstructs high quality surfaces through a global optimization, and moreover, only requires solving a well-conditioned sparse linear system, which can be efficiently done on the GPU.

To this end, the following steps are performed on the GPU:
1. Build a linear system Lx=b, where L is the Laplacian matrix and b is the divergence vector.
2. Solve the above linear system using a multigrid solver.
3. Compute the isovalue as an average of the implicit function values at sample points
4. Extract the isosurface using marching cubes.

With respect to step (1) and computing the Laplacian Matrix L, as is known, the implicit function $\phi$ is a weighted linear combination of a set of blending functions $\{F_o\}$ with each function $F_o$ corresponding to a node of the octree. An entry of the Laplacian matrix $L_{o,o'}=(F_o, \Delta F_{o'})$ is the inner product of blending function $F_o$ and the Laplacian of $F_{o'}$. The blending function $F_o$ is given by a fixed basis function F:

$$F_o(q) = F\left(\frac{q - o \cdot c}{o \cdot w}\right) \frac{1}{o \cdot w^3},$$

where o, c and o, w are the center and width of the octree node o. F is non-zero only inside the cube $[-1, 1]^3$. As is known, F is a separable function of x, y and z. As a result, the blending function $F_o$ is separable as well and can be expressed as:

$$F_o(x,y,z) = f_{o\cdot x, o\cdot w}(x) f_{o\cdot y, o\cdot w}(y) f_{o\cdot z, o\cdot w}(z)$$

Given the definition of Laplacian $$\Delta F_{o'} = \frac{\partial^2 F_{o'}}{\partial x^2} + \frac{\partial^2 F_{o'}}{\partial y^2} + \frac{\partial^2 F_{o'}}{\partial z^2},$$

the Laplacian matrix entry $L_{o,o'}$ can be computed as:

$$L_{o,o'} = \left\langle F_o, \frac{\partial^2 F_{o'}}{\partial x^2} \right\rangle + \left\langle F_o, \frac{\partial^2 F_{o'}}{\partial y^2} \right\rangle + \left\langle F_o, \frac{\partial^2 F_{o'}}{\partial z^2} \right\rangle$$

$$= \langle f_{o\cdot x,o\cdot w}, f''_{o'\cdot x,o'\cdot w}\rangle\langle f_{o\cdot y,o\cdot w}, f_{o'\cdot y,o'\cdot w}\rangle\langle f_{o\cdot z,o\cdot w}, f_{o'\cdot z,o'\cdot w}\rangle +$$
$$\langle f_{o\cdot x,o\cdot w}, f_{o'\cdot x,o'\cdot w}\rangle\langle f_{o\cdot y,o\cdot w}, f''_{o'\cdot y,o'\cdot w}\rangle\langle f_{o\cdot z,o\cdot w}, f_{o'\cdot z,o'\cdot w}\rangle +$$
$$\langle f_{o\cdot x,o\cdot w}, f_{o'\cdot x,o'\cdot w}\rangle\langle f_{o\cdot y,o\cdot w}, f_{o'\cdot y,o'\cdot w}\rangle\langle f_{o\cdot z,o\cdot w}, f''_{o'\cdot z,o'\cdot w}\rangle.$$

The above inner products can be efficiently computed by looking up two pre-computed two-dimensional tables: one for $\langle f_o, f_{o'}\rangle$ and the other for $\langle f_o, f''_{o'}\rangle$. These two tables are queried using the x-bits, y-bits, or z-bits of the shuffled xyz keys of node o and o'. This reduces the table size significantly. For a maximal octree depth 9, the table size is $(2^{10}-1)\times(2^{10}-1)$. The table size may be further reduced because the entries of the tables are symmetric.

For evaluating the divergence vector b, the divergence coefficients $b_o$ can be computed as:

$$b_o = \sum_{o' \in O^D} \vec{v}_{o'} \cdot \vec{u}_{o,o'},$$

where $\vec{u}_{o,o'} = \langle F_o(q), \nabla F_{o'}\rangle$. $O^D$ is the set of all octree nodes at depth D. The inner product $\langle F_o(q), \nabla F_{o'}\rangle$ can be efficiently computed using a precomputed lookup table for $\langle f_o, f_{o'}\rangle$ as in the computation of $L_{o,o'}$. As for $\vec{v}_{o'}$, it is computed as:

$$\vec{v}_{o'} = \sum_{q_i \in Q} \alpha_{o',q_i} \vec{n}_i, \quad (1)$$

where $\alpha_{o,qi}$ is the weight by which each sampling point $q_i$ distributes the normal $\vec{n}_i$ to its eight closest octree nodes at depth-D. Listing 3 provides the pseudocode for computing the divergence vector b.

Listing 3 Compute Divergence Vector b:

```
 1: // Step 1: compute vector field
 2: for each node o at depth D in parallel
 3:     v⃗_o = 0
 4:     for j = 0 to 26
 5:         t ← NodeArray[o.neighs[j]]
 6:         for k = 0 to t.pnum
 7:             i = t.pidx + k
 8:             v⃗_o += n⃗_i F_{qi,o,w}(o.c)
 9: // Step 2: compute divergence for finer depth nodes
10: for d = D to 5
11:     for each node o at depth d in parallel
12:         b_o = 0
13:         for j = 0 to 26
14:             t ← NodeArray[o.neighs[j]]
15:             for k = 0 to t.dnum
16:                 idx = t.didx + k
17:                 o' ← NodeArray[idx]
18:                 b_o += v⃗_{o'} u⃗_{o,o'}
19: // Step 3: compute divergence for coarser depth nodes
20: for d = 4 to 0
21:     divg ← new array
22:     for node o at depth d
23:         for each depth-D node o' covered by all nodes in o.neighs
            in parallel
24:             divg[i] = v⃗_{o'} u⃗_{o,o'}
25:         b_o = Reduce(divg, +)
```

This computation takes three steps. In a first step, the vector field $\vec{v}_{o'}$ is computed for each octree node o' according to Equation (1). Since Equation (1) essentially distributes sample point $q_i$'s normal $\vec{n}_i$ to its eight nearest octree nodes at depth D, vector $\vec{v}_{o'}$ is only affected by the sample points that are contained in either node o' or its twenty-six neighbors. The pointers to the node neighbors (recorded as described above) are used to locate these neighbors.

In a second step, the divergence at every finer depth, which is defined as any depth greater than four, is computed in parallel for all nodes, as shown in Step 2 of Listing 3. One way to accumulate $b_o$ for each octree node o is to iterate through all nodes o' at depth D. However, this costly full iteration is actually not necessary because the basis function F's domain of support is the cube $[-1, 1]^3$, $\vec{u}_{o,o'}$ equals zero for a large number node pairs (o, o'). Specifically, for node o, only the depth-D nodes whose ancestors are either o or o's neighbors have nonzero $\vec{u}_{o,o'}$. These nodes can be located by iterating over o's neighbors. Note that t.dnum and t.didx are the number of depth-D nodes covered by t and the pointer to t's first depth-D node respectively. These data can be easily obtained and recorded during tree construction.

In a third step, the divergence at every coarser depth, which in one implementation is defined as any depth not greater than four, is computed. For nodes at a coarser depth, the approach taken in the second step is not appropriate because it cannot exploit the fine-grained parallelism of GPUs.

The node number at coarser depths is much smaller than that at finer depths, and the divergence of a node at a coarser depth may be affected by many depth-D nodes. For example, at depth zero, there is only one root node and all depth-D nodes contribute to its divergence. To maximize parallelism, the computation is parallelized over all covered depth-D nodes for nodes at coarser depths. As shown in step 3 of Listing 3, the divergence contribution is first computed for each depth-D node in parallel, followed by a reduction operation to sum up the contributions.

The GPU multigrid solver is rather straightforward. For each depth d from coarse to fine, the linear system $L^d x^d = b^d$ is solved using a conjugate gradient solver for sparse matrices as is known. $L^d$ contains as many as 27 nonzero entries in a row. For each row, the values and column indices of nonzero entries are stored in a fixed-sized array. The number of the nonzero entries is also recorded.

Note that the divergence coefficients at depth d need to be updated using solutions at coarser depths. For the blending function $F_o$ of an arbitrary octree node o, only the blending functions of o's ancestors and their 26 neighbors may overlap with $F_o$. Therefore, these nodes may be visited through the pointers stored in parent and neighs fields of node o.

To evaluate the implicit function value at an arbitrary point q in the volume, the octree is traversed. Listing 4 shows the pseudo code of a depth-first traversal for this purpose:

Listing 4: compute implicit function value $\phi_q$ for point q:

```
1: φ_q = 0
2: nodestack ← new stack
3: nodestack.push(proot)
4: while nodestack is not empty
5:     o ← NodeArray[nodestack.pop( )]
6:     φ_q + = F_o(q)φ_o
7:     for i = 0 to 7
8:         t ← NodeArray[o.children[i]]
9:         if q.x–t.x < t.w and q.y–t.y < t.w and q.z–t.z < t.w then
10:            nodestack.push(o.children[i])
```

A stack is used to store the pointers to the nodes to be traversed. For this traversal, a stack size of 8D is enough for octrees with a maximal depth D.

Note that the implicit function value of a sample point $q_i$ can be evaluated in a more efficient way, because the process already knows the depth-D node o where $q_i$ is located. In other words, only octree nodes whose blending function may overlap with that of o need to be traversed. These nodes include o itself, o's neighbors, o's ancestors, and the neighbors of o's ancestors. With the implicit function values at all sample points, the isovalue is computed as an average:

$$\overline{\varphi} = \sum_i \varphi(q_i)/N$$

A marching cubes technique on the leaf nodes of the octree is used to extract the isosurface. The output is a vertex array and a triangle array which can be rendered directly.

The depth-D nodes are processed in five steps. First, the implicit function values are computed for all octree vertices in parallel. As in the case with the sample points, each vertex v's implicit function value can be efficiently computed by traversing only the related nodes, which can be located through the pointers stored in v.nodes. Second, the number of output vertices is computed with a single pass over the octree edges and the output address is computed by performing a scan operation. Third, each node's cube category is calculated and the number and addresses of output triangles are computed.

In Step 4 and 5 the vertices and triangles are generated and saved. During this process, for each face of each node, if one of its four edges has a surface-edge intersection, the face is deemed to contain surface-edge intersections, and the face is marked. This information is propagated to the node's ancestors. For leaf nodes at other depths, nodes that do not produce triangles in parallel are filtered out. For each node, if the implicit function values at its eight corners have the same sign and none of its six faces contain surface-edge intersections, the node does not need any further processing. Otherwise, the node is subdivided to depth D. The depth-D nodes generated by this subdivision are collected to build the new node, vertex and edge arrays.

Then, code corresponding to Listing 5 is performed to generate vertices and triangles:

Listing 5 Marching Cubes

```
1: // Step 1: compute implicit function values for octree vertices
2: vvalue ← new array
3: for each octree vertex i at depth-D in parallel
4:     Compute the implicit function value vvalue[i]
5:     vvalue[i] – = φ̄
```

Listing 5 Marching Cubes

```
6: // Step 2: compute vertex number and address
7: vexNums ← new array
8: vexAddress ← new array
9: for each edge i at depth-D in parallel
10:    if the values of i's two vertices have different sign then
11:        vexNums[i] = 1
12:    else
13:        vexNums[i] = 0
14: Scan(vexAddress, vexNums, +)
15: // Step 3: compute triangle number and address
16: triNums ← new array
17: triAddress ← new array
18: for each node i at depth-D in parallel
19:    Compute the cube category based the values of i's vertices
20:    Compute triNums[i] according to the cube category
21: Scan(triAddress, triNums, +)
22: // Step 4: generate vertices
23: Create VertexBuffer according to vexAddress
24: for each edge i at depth-D in parallel
25:    if vexNums[i] == 1 then
26:        Compute the surface-edge intersection point q
27:        VertexBuffer[vexAddress[i]] = q
28: // Step 5: generate triangles
29: Create TriangleBuffer according to triAddress
30: for each node i at depth-D in parallel
31:    Generate triangles based on the cube category
32:    Save triangles to TriangleBuffer[triAddress[i]]
```

This procedure is carried out iteratively until no new triangles are produced. Note that in each iteration, there is no need to handle the nodes subdivided in previous iterations. To remove duplicate surface vertices and merge vertices located closely to each other, the shuffled xyz key is computed for each vertex, with the keys used to sort all vertices. Vertices having the same key values are merged by performing a parallel compact operation. The elements in the triangle array are updated accordingly and all degenerated triangles are removed. Each triangle's normal is also computed.

Exemplary Operating Environment

Figure 5:
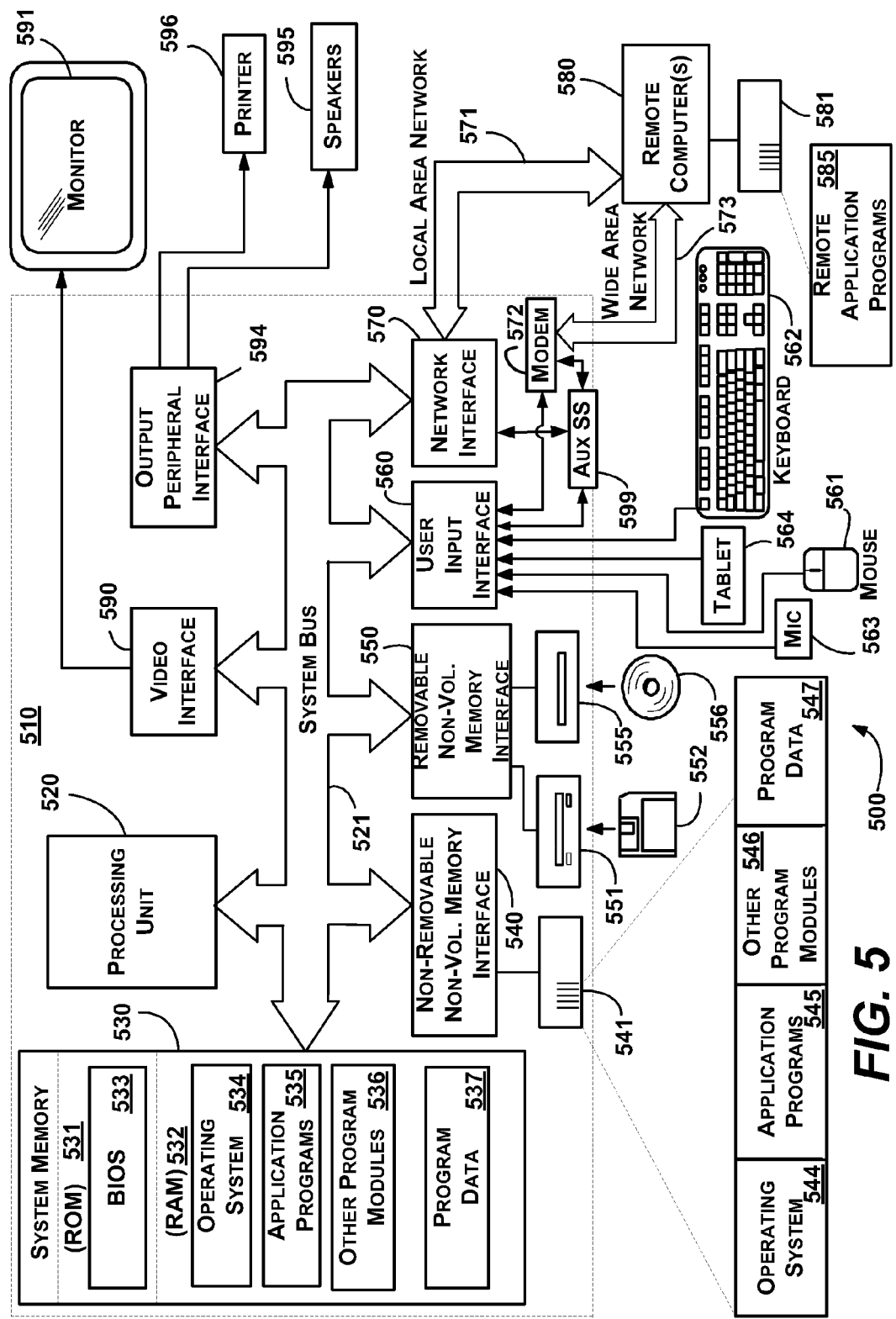
FIG. 5 shows an illustrative example of a computing environment into which various aspects of the present invention may be incorporated.

FIG. 5 illustrates an example of a suitable computing and networking environment 500 on which the examples of FIGS. 1-4B may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising, performing surface reconstruction in parallel via a graphics processing unit, including building a data structure of nodes for a given set of oriented points, each node containing a set of points enclosed by the node, traversing the data structure using level-order traversals to process nodes at a same tree level in parallel, including determining at least some indirect pointers to each node's relatives prior to building the data structure, using the indirect pointers to determine neighborhood information for each of the nodes independent of the data structure, and reconstructing the surface based on data located in the nodes.

2. The method of claim 1 wherein each node of at least some of the nodes further contains an identifying key and pointers to related nodes.

3. The method of claim 1 wherein the data structure comprises an octree, and wherein building the data structure comprises building a node array via a reverse level-order traversal of the octree from a finest depth level towards a root level.

4. The method of claim 1 wherein each node of at least some of the nodes at a level further contains an identifying key and pointers to related nodes, and wherein building the data structure comprises, using the pointers of nodes at one depth level to build a higher level depth node array.

5. The method of claim 1 further comprising, building at least one lookup table to record indirect pointers to a node's relatives, and wherein traversing the data structure includes accessing each lookup table to determine neighborhood information for the node.

6. The method of claim 5 further comprising, using at least one lookup table to determine neighborhood information for a node, and further comprising, using the neighborhood information to compute vertex, edge and face structures.

7. The method of claim 5 wherein one lookup table comprises a parent table that maintains information related to a node's parent, and further comprising, accessing the parent table to determine neighborhood information for that node.

8. The method of claim 5 wherein one lookup table comprises a child table that maintains information related to a node's child, and further comprising, accessing the child table to determine neighborhood information for that node.

9. The method of claim 1 wherein reconstructing the surface comprises extracting an isosurface as a triangle mesh.

10. The method of claim 9 further comprising performing an adaptive marching cubes procedure for extracting the isosurface.

11. The method of claim 1 wherein reconstructing the surface comprises using Poisson equation for surface reconstruction.

12. The method of claim 1 further comprising, performing a procedure for evaluating a divergence vector in a Poisson equation.

13. In a computing environment, a system comprising, a graphics processing unit and a surface construction mechanism configured to build an octree to represent a set of points from which surfaces are extracted, the octree built by computing nodes of the octree, including by building at least two lookup tables to each node's relatives prior to building the octree, traversing the octree using level-order traversals, each level order traversal performed in parallel via the graphics processing unit for nodes of that level and using the at least two lookup tables to determine neighborhood information independent of the octree.

14. The system of claim 13 wherein each node of at least some of the nodes contains an identifying key, a subset of the set of points corresponding to those points contained in the node, and pointers to related nodes.

15. The system of claim 13 further comprising means for extracting a surface from the node, including by accessing at least one lookup table that maintains information related to a node's related nodes.

16. The system of claim 13 wherein the surface construction mechanism is coupled to an interactive application, the interactive application configured to communicate with the surface construction mechanism to display a scene in real time by rebuilding the octrees and to extract surfaces to produce frames of the scene.

17. One or more computer-readable storage device having computer-executable instructions, which when executed perform steps, comprising, building an octree of nodes for a given set of oriented points, each node containing a set of points enclosed by the node and corresponding to indirect pointers to related nodes of the node, including by communicating with a graphics processing unit to compute at least some of the indirect pointers prior to building the octree, process nodes at a same tree depth level in the octree in parallel, and, when indirect pointers of nodes at one depth level are available, using the indirect pointers to determine neighborhood information independent of the octree and build nodes of a higher level depth.

18. The one or more computer-readable storage device of claim 17 having further computer-executable instructions comprising, extracting an isosurface by processing the octree.

19. The one or more computer-readable storage device of claim 18 wherein extracting the isosurface comprises using a Poisson equation for surface reconstruction.

20. The one or more computer-readable storage device of claim 17 having further computer-executable instructions comprising, building at least one lookup table to record the indirect pointers to a node's relatives.

\* \* \* \* \*